United States Patent
Eiseman et al.

(10) Patent No.: US 7,524,366 B2
(45) Date of Patent: Apr. 28, 2009

(54) IR TRANSPARENT CYAN INKJET INK

(75) Inventors: Michael J. Eiseman, Swarthmore, PA (US); Kuo Hsiung Kung, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/800,228

(22) Filed: May 4, 2007

(65) Prior Publication Data

US 2007/0263057 A1    Nov. 15, 2007

Related U.S. Application Data

(60) Provisional application No. 60/798,906, filed on May 9, 2006.

(51) Int. Cl.
*C09D 11/02* (2006.01)
*B41J 2/01* (2006.01)

(52) U.S. Cl. .................. 106/31.27; 106/31.32; 347/100

(58) Field of Classification Search .............. 106/31.27, 106/31.32; 347/100
See application file for complete search history.

(56) References Cited

U.S. PATENT DOCUMENTS

| | | | |
|---|---|---|---|
| 5,093,147 A | 3/1992 | Andrus et al. | |
| 5,423,432 A | 6/1995 | Krutak et al. | |
| 5,461,136 A | 10/1995 | Krutak et al. | |
| 5,990,197 A | 11/1999 | Escano et al. | |
| 6,149,719 A | 11/2000 | Houle | |
| 6,378,976 B1 | 4/2002 | Byers et al. | |
| 6,656,228 B1 * | 12/2003 | Sherwin et al. | 8/188 |
| 7,279,032 B2 * | 10/2007 | Wheeler et al. | 106/31.27 |
| 7,282,090 B2 * | 10/2007 | Osumi et al. | 106/31.47 |

\* cited by examiner

*Primary Examiner*—Helene Klemanski

(57) ABSTRACT

The present invention pertains to a cyan dye-based inkjet ink having substantially no absorption in the near-infrared region of the spectrum (near-IR transparent). The invention further pertains to a dye-based inkjet ink set comprising this near-IR transparent cyan ink.

8 Claims, No Drawings

IR TRANSPARENT CYAN INKJET INK

CROSS-REFERENCE TO RELATED APPLICATION

This application claims the benefit of U.S. Provisional Application Ser. No. 60/798,906 filed on May 9, 2006 which is hereby incorporated by reference in its entirety.

BACKGROUND OF THE INVENTION

The present invention pertains to a dye-based cyan inkjet ink that is relatively transparent in the near-infrared region of the spectrum (IR transparent). The invention further pertains to a dye-based inkjet ink set comprising this IR transparent cyan ink and to methods of using same.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

There is commercial interest in providing intelligible markings on the surface of articles that are virtually invisible to the human eye, but which can be detected, for example, by a scanning device. Such markings can be used for authentication, sorting and other uses. It is further desirable to combine invisible markings with colored images and in particular colored images created by inkjet printing. The colored images preferably do not interfere with the detection of the invisible markings.

To create invisible markings, it is known to use near-infrared (IR) absorbing and infrared fluorescent compounds which have minimal light absorption in the visible light wavelength range of about 400-700 nm, and which have strong light absorbance in the near infrared wavelength region of about 700-900 nm. These compounds may also have accompanying fluorescence to produce fluorescent radiation having wavelengths longer than the wavelength of excitation. See, for example, U.S. Pat. Nos. 5,093,147; 5,423,432; and 5,461,136. The infrared absorbance or fluorescence is detected by IR sensitive devices such as cameras and sensors.

Invisible infrared inks have been disclosed for ink jet printing. For example, U.S. Pat. No. 5,990,197 discloses an organic solvent based polyester ink formulation having an infrared fluorescing compound suitable for ink jet printing.

To achieve full color images, ink jet printers typically employ a cyan, magenta and yellow ink (CMY ink set). These colors are known as subtractively-mixing primaries as light is subtracted as it passes through the colorant. These three colored inks can be used to print the entire range of hues. Inks sets commonly comprise, in addition, a black ink (CMYK ink set).

When used in combination with an IR absorbing/fluorescing marker, an ink set will preferably be non-absorbing (transparent) in the near-infrared region. Many magenta, yellow and black dyes commonly employed in current practice are satisfactorily transparent in this region of the spectrum. The notable exception is the cyan dye.

Cyan colored inkjet inks generally employ a copper phthalocyanine-based chromophore, for example, Direct Blue 199. Phthalocyanines, however, are widely known to absorb in the infrared (see, for example, *The Phthalocyanines*, Vol 1. Moser et al. CRC Press).

There is a need in the art for a cyan inkjet ink and a CMY inkjet ink set that is substantially transparent in the near-IR wavelength region.

SUMMARY OF THE INVENTION

In one aspect, the present invention pertains to a cyan inkjet ink comprising an aqueous vehicle and a dye colorant soluble in the aqueous vehicle, wherein the dye colorant comprises Acid Blue 9 and a second dye selected from the group consisting of Acid Blue 260, Acid Blue 158, Reactive Blue 264, Reactive Blue 176 and mixtures thereof.

It was found that these colorants could be combined to provide a satisfactory cyan ink with relatively low absorbance in the near-IR region and thus avoid the IR absorbance issues associated with typical cyan dyes used in commercial inkjet inks.

In another aspect, the present invention pertains to an inkjet ink set comprising at least three colored visible inks, wherein the at least three colored visible inks comprise a first ink cyan in color, a second ink magenta in color and a third ink yellow in color, wherein each of the first, second and third inks individually comprises an aqueous vehicle and a soluble colorant, wherein the colorant in the first ink comprises cyan colorant as set forth above, and wherein the colored visible inks of the ink set are transparent in the near-IR region (700-900 nm). Preferably, the colorants for each of the visible inks have an absorbance ratio of about 7.5% or less, wherein absorbance ratio is:

maximum absorbance (700-750 nm)
maximum absorbance (400-700 nm)

expressed as percent.

By "visible" is meant visible to the normal human eye (unaided).

The ink set may include one or more additional near-IR transparent, colored, visible inks such as, for example, a black, blue, green and/or red ink. In a preferred embodiment, the ink set further includes a black ink.

The inventive ink set is especially advantageous for use in combination with a substantially invisible, near-IR absorbing or fluorescing marking, as the invisible marking can still be detected by IR sensitive devices through the colored inks.

The invisible markings can be applied by any suitable means. For example, invisible IR-detectable markings can applied to a substrate by traditional analog printing methods, and visible images can be applied by inkjet printing with the inventive ink set.

In a preferred embodiment, the inventive ink set further comprises a substantially colorless ink (invisible ink) with an IR-detectable marker, and invisible markings are digitally applied as part of the inkjet printing process with the inventive ink set.

The present invention further includes a method for ink jet printing onto a substrate, comprising the steps, in any workable order, of:
  (a) providing an ink jet printer that is responsive to digital data signals;
  (b) loading the printer with a substrate to be printed;
  (c) loading the printer with an inkjet ink set forth above; and
  (d) printing onto the substrate using the inkjet ink set in response to the digital data signals.

The substrate to be printed according to the inventive method can contain invisible markings that absorb or fluoresce in the near infrared, and which invisible markings remain detectable when underprinted and/or overprinted with the colored inks of the ink set.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Cyan Ink

The prescribed cyan inkjet ink comprises an aqueous vehicle and a dye colorant soluble in the aqueous vehicle. The ink may optionally comprise other ingredients such as additives to enhance properties.

The cyan colorant is a mixture of Acid Blue 9 and a second dye selected from the group consisting of Acid Blue 260, Acid Blue 158, Reactive Blue 264, Reactive Blue 176 and mixtures thereof. The Acid Blue 9 has low near-IR absorbance and good hue, but very poor lightfastness. The members of the group of second dyes have reasonable lightfastness, and relatively low near-IR absorbance, but are somewhat too "red" in hue (high hue angle) to be used alone as the cyan colorant. However, in combination, the Acid Blue 9 can "shade" the second dye and provide an ink with a more preferred hue. By using only a limited amount of Acid Blue 9, there is a reasonably small lightfastness penalty.

The ratio of AB9 to second dye can be any desired ratio providing suitable coloristic and lightfastness properties. In one embodiment, the weight ratio of AB9 to second dye (cumulative) is less or equal to one. In another embodiment the weight ratio of AB9 to second dye is between 1:100 and 1:1.

The cyan colorants, and other dyes mentioned herein, are referred to by their "C.I." designation established by Society Dyers and Colourists, Bradford, Yorkshire, UK and published in *The Color Index*, Third Edition.

Dyes are selected for transparency in the near-IR region. The term "near-IR transparent" in the context of the present invention, means a broad region of relatively low absorption in the 700 to 900 nm range. This not exclude the presence of some absorption overlap of a colorant in the near-IR region but, the absorption should not be so much as to significantly interfere with the detection of invisible IR absorbent/fluorescent markings.

The absorption of the colorants in the near-IR region is generally a "shoulder" from the peak in the visible, and colors with visible absorption at longer wavelengths (i.e. closer to 700 nm) have more of a problem with tail of the peak extending into the near-IR region.

The combination of dyes named above are suitable for achieving a desirable cyan color without inclusion of any other colorant(s). Thus, in one embodiment the present invention pertains to an inkjet ink comprising colorant consisting only of Acid Blue 9 and one or any combination of Acid Blue 260, Acid Blue 158, Reactive Blue 264, Reactive Blue 176.

Although the prescribed colorant is sufficient in and of itself, it is likely possible to add small amounts of other colorant without substantially changing the present invention or losing the benefits of thereof. Thus, in another embodiment, the present invention pertains to an inkjet ink comprising colorant consisting essentially of Acid Blue 9 and one or any combination of Acid Blue 260, Acid Blue 158, Reactive Blue 264, Reactive Blue 176.

Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Additives

Other ingredients, additives, may be formulated into the inkjet ink, to the extent that such other ingredients do not interfere with the stability and jetting of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in the cyan ink of the present invention and other inks mentioned herein after, is typically in the range of about 70% to about 99.8%, and preferably about 80% to about 99.8%, based on total weight of the ink. The colorant (and IR marker) will generally be present between about 0.1% to about 12%, and more typically in the range of about 1% to about 8%, by weight of the total ink. Because of the low near-IR absorbance of the prescribed cyan dyes, the colorant in the cyan ink can be 3% or more, thus providing good color strength without near-IR interference.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm (20 mN.m$^{-1}$ to 70 mN.m$^{-1}$) at 25° C. Viscosity can be as high as 30 cP (30 mPa·s) at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps (7 mPa·s); less than about 5 cps (5 mP·s), and less than about 3.5 cps (3.5 mPa.s).

Ink Set

The inventive cyan ink is advantageously used a member of an ink set. The term "ink set" refers to all the individual fluids an inkjet printer is equipped to jet. These fluids include all visibly colored inks, all invisible inks and all non-colored inks. Non-colored (colorless) inks are inks with neither colorant nor IR detectable compound and are generally used to fix or enhance the durability of the colored inks or to enhance or equalize gloss.

A CYM ink set can, for example, comprise the inventive cyan ink in combination with: a near-IR transparent magenta ink comprising a colorant selected from one or a combination of Acid Red 52, Reactive Red 180 (optionally pre-hydrolyzed), Acid Red 37, Acid Red 249, Acid Red 289, Direct Red 227 and CAS Number 182061-89-8 (Ilford M377, for example); and an near-IR transparent yellow ink comprising a colorant selected from one or combination of Direct Yellow 86, Direct Yellow 132, Acid Yellow 23 and CAS Number 187674-70-0 (Ilford Y104, for example).

The ink set can further comprise an near-IR transparent black ink comprising colorant selected from one or combination of DK 31, DB 195, Food Black 2, AK 194 and AK 172.

An ink set can comprise an invisible ink. "Invisible" in this context means substantially invisible to the normal human eye (unaided), but detectable by absorbance or fluorescence in the near-IR region. Invisible inks in the context of the present invention comprise a vehicle and an IR marker.

The IR marker is generally, but not necessarily, a soluble dye. Infrared absorbing dyes include pentamethinecyanines, metal phthalocyanines, anthroquinone dyes, naphthoquinone dyes, dithiol and dithiene metal complexes, and squarylium dyes (see, for example *Color Chemistry*, Heinrich Zollinger VCN 1987). Examples of infrared-absorbing dyes in ink-jet inks are found in U.S. Pat. Nos. 6,378,976: 6,149,719; and 5,990,197 (the disclosures of which are incorporated by reference herein for all purposes as if fully set forth).

Suitable vehicles (and optional components) for the other inks in the ink set are the same as set forth above for the cyan ink.

The following examples illustrate the invention without, however, being limited thereto.

EXAMPLES

Herein, L*, a* and b* refer to CIELAB colorspace terms. Hue ($h_{ab}$) and chroma ($C^*_{ab}$) values are based on the following equations: $h_{ab}=\tan^{-1}(b^*/a^*)$ where the angle is adjusted for the appropriate quadrant and $C^*_{ab}=(a^{*2}+b^{*2})^{1/2}$. The measurements and definitions are well known in the art, see for example ASTM Standard E308 and *Principles of Color Technology*, Billmeyer and Saltzman, 3rd Ed., Roy Berns editor, John Wiley & Sons, Inc. (2000).

IR Absorbance and Hue Angle

The following results show the hue and near-IR transparency of various cyan colorants in solution, some of which are used in the present invention. Measurements were made with a Hewlett Packard 8453 UV-Visible Spectrophotometer. The dye was diluted with water until the absorbance of the peak absorbance wavelength, lambda max, was between 0.2 and 0.8 absorbance units. The instrument software calculated the L*a*b* values and hue and chroma automatically from the measured spectrum.

The absorbance ratio was the absorbance at 700 and 750 nm (Abs 700 and Abs 750) divided by the absorbance at the maximum point in the visible (Abs max 400-700). The wavelength of maximum absorbance in the visible varied with each ink. The results summarized below are expressed as percent (ratio×100); a lower value indicates greater near-IR transparency. The absorption in the near-IR region is a shoulder from the absorption peak in the visible region and consequently the maximum absorbance in the near-IR occurs right at 700 nm and tails off from there. Thus, a low absorbance at 700 nm is indicative of low absorbance throughout the near-IR region.

The lightfastness of the dyes is also noted. It is rated on a scale 1-8 (8 is most lightfast; 1 is least lightfast). The "second dye" prescribed for the cyan inks this invention will have a lightfastness better than AB 9 and preferably at least as good or better than DB 199.

| Dye | Hue | Abs 700/ Abs Max | Abs 750/ Abs Max | Lightfastness |
|---|---|---|---|---|
| DB 199 | 221 | 24.6 | 5.9 | 5.5-6 |
| AB 9 | 216 | 0.6 | 0.0 | 1-3 |
| RB 264 | 261 | 2.5 | 0.4 | 7 |
| AB 158 | 250 | 1.2 | 0.4 | 4-5 |
| AB 260 | 274 | 2.5 | 0.5 | 6-6.5 |
| RB 176 | 264 | 3.2 | 1.0 | 5-5.5 |
| AB 290 | 219 | 26.4 | 2.3 | — |
| AB 239 | 227 | 35.6 | 3.5 | — |
| AB 83 | 306 | 3.7 | — | — |

Ink Jet Ink Examples

Inks were prepared according to the following formulations. Proportions are in percent weight of the total weight of ink. Ingredients were mixed together and filtered. Water was deionized. Surfynol® 465 is a surfactant from Air Products Corp (Allentown, Pa., USA). Proxel™ GXL is a Biocide from Avecia (Wilmington, Del., USA). TRIS is tris(hydroxymethyl)aminomethane, a buffer.

Inks were printed with a Canon i960 printer onto Xerox 4024 "plain" paper at full coverage. Color values were measured using a Greytag-Macbeth Spectrolino spectrometer.

Inks similar to Inks 1 and 2 can be prepared with RB 264 and/or RB 176 in place of AB 260. Based on the hue angle and IR transparency noted previously, they would be expected to provide suitable cyan inks. However, aqueous formulations of reactive dyes, in general, are known to hydrolyze during storage. The hydrolysis by-products can be tolerated in some applications but not others. For non-textile inkjet applications, to avoid hydrolysis by-products, it is known to pre-hydrolyze and purify the reactive dyes prior to ink formulation. However, pre-hydrolysis adds an additional processing step and preferably such a step can be avoided.

Various other modifications, alterations, additions or substitutions of the compositions and methods of this invention will be apparent to those skilled in the art without departing from the spirit and scope of this invention. This invention is not limited by the illustrative embodiments set forth herein, but rather is defined by the following claims.

The invention claimed is:

1. A cyan inkjet ink composition comprising an aqueous vehicle and a cyan dye colorant soluble in the aqueous vehicle, wherein the cyan dye colorant comprises Acid Blue 9 and a second dye selected from the group consisting of Acid Blue 260, Acid Blue 158, Reactive Blue 264, Reactive Blue 176 and mixtures thereof, wherein the weight ratio of Acid Blue 9 to said second dye is from about 1:100 to about 1:1.

2. The ink of claim 1, wherein the second dye comprises Acid Blue 260.

3. An inkjet ink set comprising at least three colored visible inks, wherein the at least three colored visible inks comprise

|  | Control | Comparative Examples | | | Inventive Inks | | |
|---|---|---|---|---|---|---|---|
|  | Ink A | Ink B | Ink C | Ink D | Ink 1 | Ink 2 | Ink 3 |
| Ingredients | | | | | | | |
| DB 199 | 3.75 | — | — | — | — | — | — |
| AB 9 | — | 2.0 | — | — | 1.0 | 0.5 | 1.0 |
| AB 260 | — | — | 4.0 | — | 4.0 | 2.0 | — |
| AB 158 | — | — | — | 4.0 | — | — | 4.0 |
| 1,6-Hexanediol | 9.0 | 9.0 | 9.0 | 9.0 | 9.0 | 9.0 | 9.0 |
| 2-Pyrrolidone | 5.0 | 5.0 | 5.0 | 5.0 | 5.0 | 5.0 | 5.0 |
| Proxel GXL | 0.2 | 0.2 | 0.2 | 0.2 | 0.2 | 0.2 | 0.2 |
| Tris | 0.2 | 0.2 | 0.2 | 0.2 | 0.2 | 0.2 | 0.2 |
| Surfynol 465 | 0.5 | 0.5 | 0.5 | 0.5 | 0.5 | 0.5 | 0.5 |
| Water, balance to 100% | Bal. | Bal. | Bal. | Bal. | Bal. | Bal. | Bal. |
| Color Properties | | | | | | | |
| Optical Density | 1.05 | 0.81 | 0.78 | 1.54 | 1.12 | 0.97 | 1.21 |
| Chroma | 60.05 | 54.92 | 58.52 | 42.56 | 58.69 | 57.78 | 31.46 |
| Hue | 244 | 228 | 274 | 273 | 256 | 255 | 251 |

Direct Blue 199 is effectively the cyan inkjet ink color standard. The cyan inks of the present invention seek to imitate the DB 199 coloristic properties while remaining substantially transparent in the near IR. It can be seen from the above data that the inventive inks can provide a reason color match, and as noted in the previous example, the dyes therein have relatively low IR absorbance. Because of higher chroma, Inks 1 and 2 (with AB 260) are more preferred than Ink 3 (with AB 158).

a first ink cyan in color, a second ink magenta in color and a third ink yellow in color, wherein each of the first, second and third inks individually comprises an aqueous vehicle and a soluble colorant, wherein the first ink is a cyan ink as set forth in claim 1, and wherein the visible inks of the ink set are substantially transparent in the near-infrared region.

4. The ink set of claim 3, wherein the colorants for each of the visible inks have an absorbance ratio of about 7.5% or less, wherein absorbance ratio is:

$$\frac{\text{maximum absorbance (700-750 nm)}}{\text{maximum absorbance (400-700 nm)}}$$

expressed as percent.

5. The ink set of claim 3, further comprising a fourth ink black in color comprising a vehicle and a black colorant.

6. The ink set of claim 3, further comprising an invisible ink comprising a vehicle and an infrared marker.

7. A method for ink jet printing onto a substrate, wherein the substrate to be printed contains invisible markings that absorb or fluoresce in the near-infrared region, and which invisible markings remain detectable when overprinted with visible inks of an ink set, comprising in any workable order:

(a) providing an ink jet printer that is responsive to digital data signals;

(b) loading the printer with a substrate to be printed;

(c) loading the printer with a cyan ink as set forth in claim 2; and (d) printing onto the substrate using the cyan ink in response to the digital data signals.

8. A method for ink jet printing onto a substrate, wherein the substrate to be printed contains invisible markings that absorb or fluoresce in the near-infrared region, and which invisible markings remain detectable when overprinted with visible inks of an ink set, comprising in any workable order:

(a) providing an ink jet printer that is responsive to digital data signals;

(b) loading the printer with a substrate to be printed;

(c) loading the printer with an inkjet ink set as set forth in claim 3; and (d) printing onto the substrate using the inkjet ink set in response to the digital data signals.

* * * * *